United States Patent
Bender et al.

(10) Patent No.: US 12,528,547 B2
(45) Date of Patent: Jan. 20, 2026

(54) FRONT FAIRINGS FOR VEHICLES

(71) Applicant: Winnebago Industries, Inc., Eden Prairie, MN (US)

(72) Inventors: Stephen Bender, Mason City, IA (US); Todd McQuown, Forest City, IA (US)

(73) Assignee: Winnebago Industries, Inc., Eden Prairie, MN (US)

( * ) Notice: Subject to any disclaimer, the term of this patent is extended or adjusted under 35 U.S.C. 154(b) by 174 days.

(21) Appl. No.: 18/405,779

(22) Filed: Jan. 5, 2024

(65) Prior Publication Data

US 2024/0239423 A1 Jul. 18, 2024

Related U.S. Application Data

(60) Provisional application No. 63/439,129, filed on Jan. 15, 2023.

(51) Int. Cl.
*B62D 35/00* (2006.01)
*H02S 10/40* (2014.01)
*B60R 16/03* (2006.01)
*H02S 20/30* (2014.01)

(52) U.S. Cl.
CPC ........... *B62D 35/005* (2013.01); *H02S 10/40* (2014.12); *B60R 16/03* (2013.01); *H02S 20/30* (2014.12)

(58) Field of Classification Search
CPC .............................. H02S 10/40; B62D 35/005
See application file for complete search history.

(56) References Cited

U.S. PATENT DOCUMENTS 4,261,613 A * 4/1981 Alford ..................... B60P 3/32
296/156
2016/0288632 A1* 10/2016 Sinha ........................ B60J 7/22
2018/0370415 A1* 12/2018 Mathiasen .......... E04F 10/0633

OTHER PUBLICATIONS

ACT News, "Solar Panels for Truck and Trailers, the Time has Come", Jul. 2, 2018, URL: https://www.act-news.com/news/solar-panels-support-trucking-industry/, 5 pages.
CCJ, "Let the sunshine in: Use of solar can boost efficiency", Sep. 23, 2019, URL: https://www.ccjdigital.com/business/article/14938837/using-solar-power-can-give-an-efficiency-boost, 10 pages.
NACFE, "Solar Panels—Tractors", Idle Reduction, Retrieved on Jan. 9, 2023, URL: https://nacfe.org/research/idle-reduction/#solar-panels-tractors, 23 pages.
Tycorun Energy, "Lithium Batteries Used in Lithium RV Battery | Solar Power System for RV", Jan. 9, 2023, 49 pages.
Tycorun Energy, "Lithium RV Battery | Solar Power System for RV : An ultimate Guide", Jan. 9, 2023, 1 page.
Wanderthewest, "40 Watt Wind Deflector Panel", Aug. 25, 2016, URL: https://www.wanderthewest.com/forum/gallery/image/12045-40-watt-wind-deflector-panel/, 2 pages.

* cited by examiner

*Primary Examiner* — Lindsey A Buck
(74) *Attorney, Agent, or Firm* — Faegre Drinker Biddle & Reath LLP

(57) ABSTRACT

A front fairing structure for attaching to a vehicle above its windshield. The front fairing structure defines a lower surface and an upper surface. The upper surface has a flatter geometry compared to the lower surface. One or more solar panels can be coupled to the upper surface of the front fairing structure.

20 Claims, 14 Drawing Sheets

FRONT FAIRINGS FOR VEHICLES

CROSS REFERENCE TO RELATED APPLICATION

This application claims priority to U.S. Provisional Application No. 63/439,129, filed Jan. 15, 2023, which is herein incorporated by reference in its entirety.

SUMMARY

Certain embodiments of the present disclosure describe various structures for modifying a shape of a front portion of a vehicle to accommodate features such as solar panels, sensors, and/or lights, among other things.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
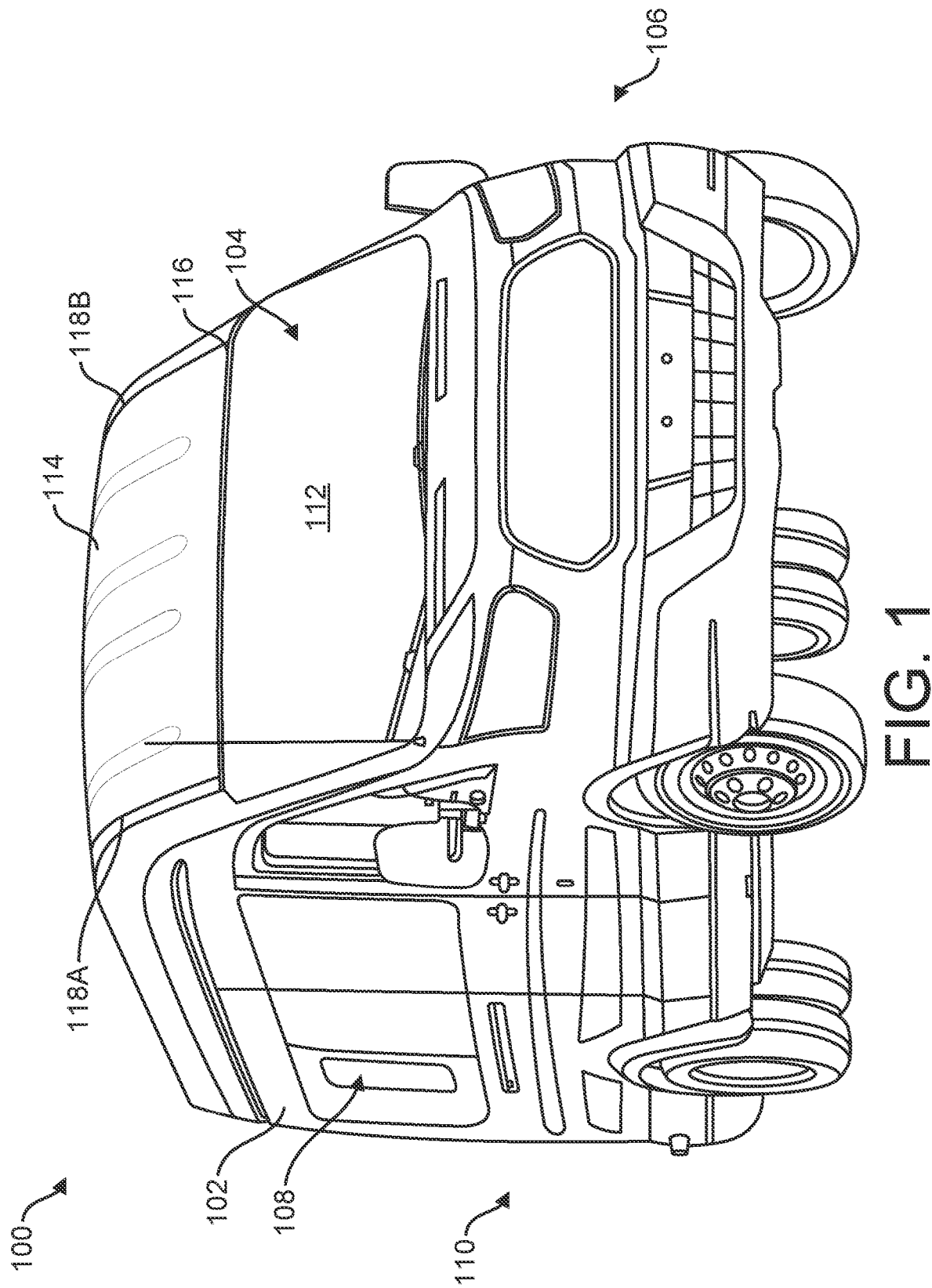
FIG. 1 shows a recreational vehicle, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

The front end of a vehicle such as a recreational vehicle is designed to be aerodynamically efficient during transit. This can result in the front end having a compound curved surface (e.g., a sphere-like curved surface) above the windshield (e.g., the "forehead" region) of the recreational vehicle. Such geometry can be challenging to utilize for other functions such as attaching solar panels. Certain embodiments of the present disclosure utilize a front fairing structure that can be attached to a vehicle above the windshield and that can incorporate features such as solar panels, lights, and/or sensors, among other things.

FIG. 1 shows a vehicle 100 having a body 102 that houses a cab area 104 at a front end 106 of the vehicle 100 and a rear area 108 (e.g., living area, storage area) positioned between the cab area 104 and a back end 110 of the vehicle 100. The vehicle 100 includes a windshield 112 that covers in an opening in the body 102. Although FIG. 1 shows a vehicle such as a Class B recreational vehicle or a camper van (e.g., a recreational vehicle based on a chassis from a vehicle like a Ford Transit van, Mercedes-Benz Sprinter van, or Ram ProMaster van), the front fairing structure described herein can be used with other types of vehicles.

The body 102 of the vehicle 100 includes a roof surface 114 that begins at or near a top outer boundary 116 of the windshield 112 and extends towards the back end 110 of the recreational vehicle 100. The front section of the roof surface 114 behind the windshield 112 is shaded in FIG. 1 and extends from one side 118A of the body 102 to an opposite side 118B of the body 102 and aft from the windshield 112. This section can be referred to as the "forehead" region of the body 102 of the recreational vehicle 100. As noted above, this section of the body 102 may have a compound curved surface.

Figure 2A:
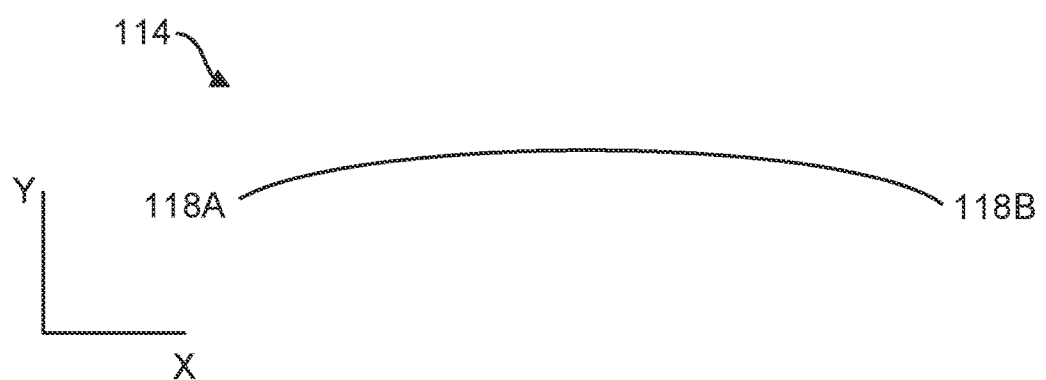
FIGS. 2A and 2B show example geometry of a roof surface of a recreational vehicle, in accordance with certain embodiments of the present disclosure.
Figure 2B:
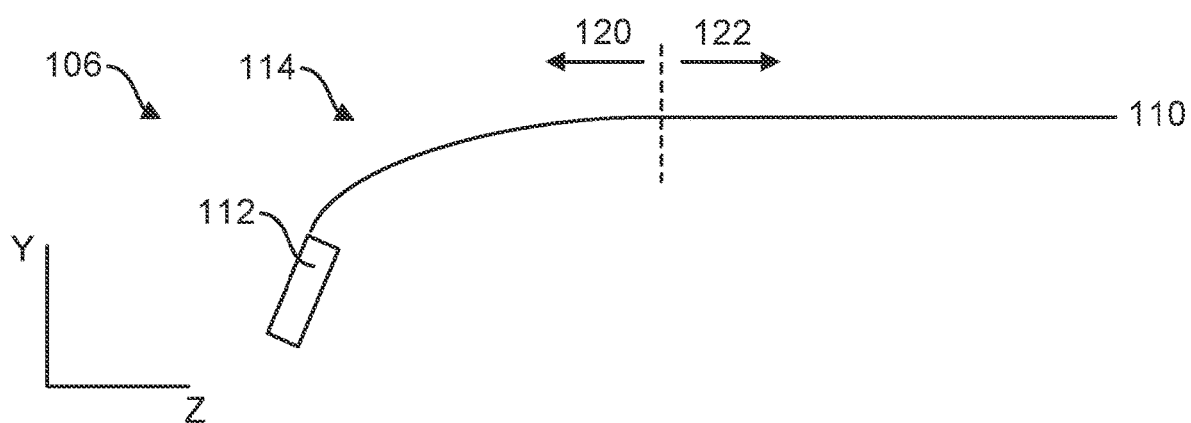

FIGS. 2A and 2B show profiles of the roof surface 114 in different planes. FIG. 2A shows the roof surface 114—in one plane—as it extends between the one side 118A to the other side 118B of the recreational vehicle 100. Put another way, FIG. 2A shows the profile of the roof surface 114 (within a plane) as viewed when standing in front of the vehicle 100. As can be seen, the roof surface 114 defines a first curve with a first radius within a first plane, although the curve of the roof surface 114 may have a different local radius at different points along the roof surface 114. In certain embodiments, the plane used for the profile shown in FIG. 2A is a plane that intersects through the forehead region of the body 102 of the recreational vehicle 100.

FIG. 2B shows the roof surface 114—in one plane—as it extends from the windshield 112 to the back end 110 of the vehicle 100. Put another way, FIG. 2B shows the profile of the roof surface 114 (within a plane) as viewed when standing on the driver's side of the vehicle 100. The planes of FIGS. 2A and 2B are perpendicular to each other.

In FIG. 2B, the roof surface 114 is divided into two regions: a forehead region 120 and an aft region 122. The forehead region 120 extends from the windshield 112 to the beginning of the aft region 122. In the forehead region 120, the roof surface 114 defines a second curve with a second radius within a second plane, although the curve of the roof surface 114 may have a different local radius at different points along the roof surface 114. In the aft section 122, the roof surface 114 is substantially flat. Components such a roof-mounted air conditioning unit, roof rack, and/or satellite (or other components) can be mounted to and extend from the roof surface 114 but are not considered part of the roof surface 114 itself.

Figure 3:
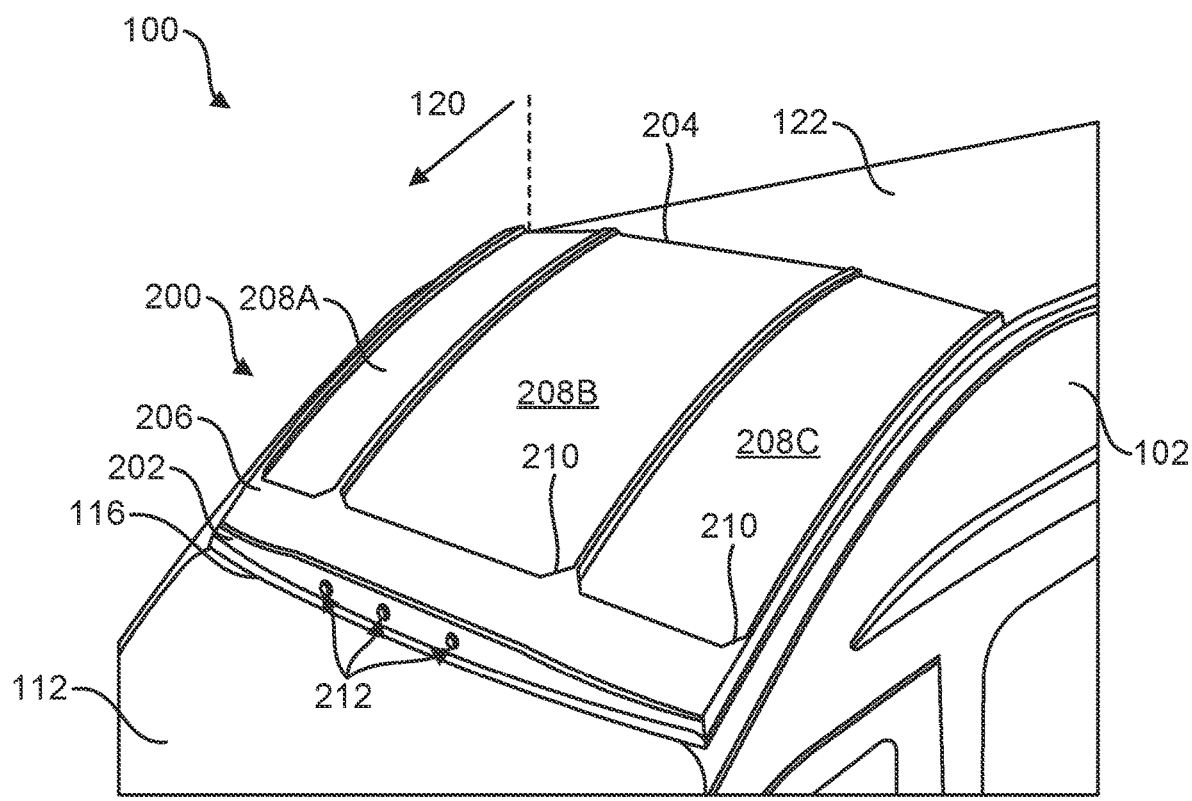
FIG. 3 shows a front fairing positioned on a recreational vehicle, in accordance with certain embodiments of the present disclosure.

FIG. 3 shows a front fairing 200 that is coupled to the body 102. In the example of FIG. 3, the front fairing 200 covers at least a portion of the forehead region 120 of the roof surface 114. The front fairing 200 extends between a front end 202 and a back end 204 and defines an upper surface 206. As shown in FIG. 3, in certain embodiments, the front end 202 of the front fairing 200 does not extend directly and immediately above the windshield 112. Instead, in such embodiments, the front fairing 200 is positioned on the body 102 such that the front end 202 begins slightly behind the upper boundary 116 of the windshield 112 and extends backwards. Put another way, the forwardmost boundary of the front fairing 200 is positioned aft of the upper boundary 116 of the windshield 112.

Recesses (208A, 208B, 208C) can be formed in the upper surface 206 of the front fairing 200 to create space for positioning items such as solar panels (which are shown in later figures). The front fairing 200 can include tabs 210 at the corners of the recesses (208A, 208B, 208C) to create slots or openings between the upper surface 206 and the tabs 210. When a solar panel is inserted into the recesses (208A, 208B, 208C), corners of the solar panel can slide into the slots/openings such that the tabs 210 help secure the solar panel and reduce the risk of corners of the solar panel peeling off the upper surface 206 due to warping, wind during transit, or other factors. Further, the guides or structures positioned along the recesses (208A, 208B, 208C) can include slots in which a portion (e.g., edges) of solar panels are positioned such that the amount of—or need for—perimeter tape is reduced. The front fairing 200 can also include lights 212 attached near the front end 202.

Figure 4A:
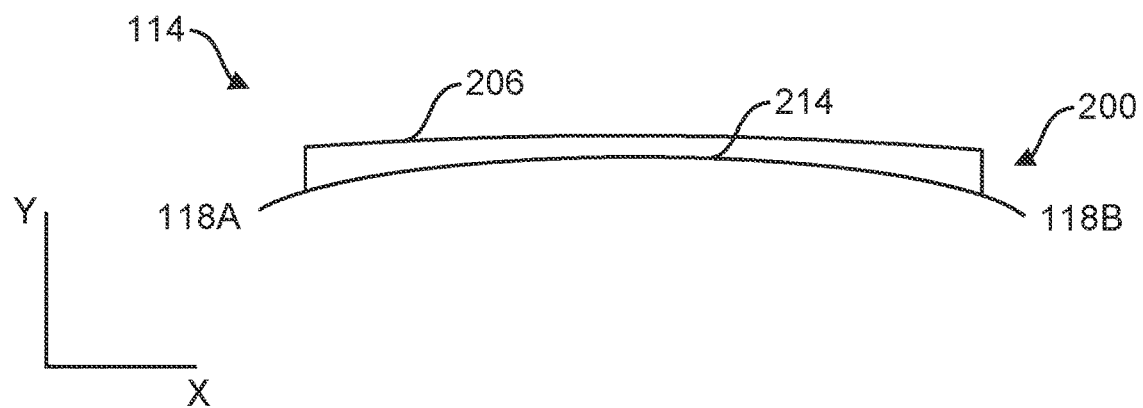
FIGS. 4A and 4B show a front fairing relative to geometry of the roof surface of a recreational vehicle, in accordance with certain embodiments of the present disclosure.
Figure 4B:
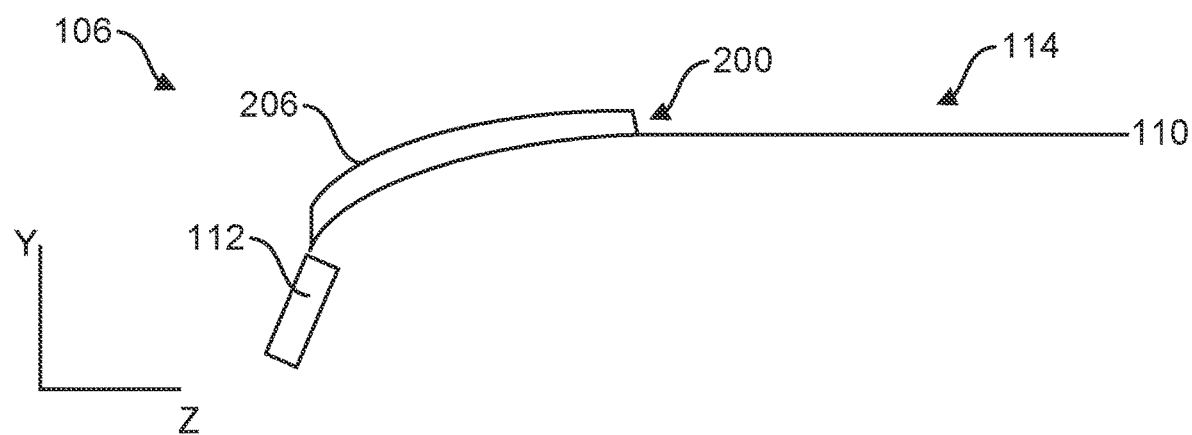

The upper surface 206 of the front fairing 200 can be shaped such that the upper surface 206 is more accommodating for attaching items such as solar panels compared to the shape of the roof surface 114. FIGS. 4A and 4B provide examples of the shape of the roof surface 114 compared to the shape of the upper surface 206 of the front fairing 200.

In FIG. 4A, the upper surface 206 of the front fairing 200 is shown as being flatter than the shape of the roof surface 114. Put another way, the upper surface 206 can include a curve, and that curve can have a radius that is greater than the curve of the roof surface 114 in a given plane. In certain embodiments, portions of the upper surface 206 are flat within the plane shown in FIG. 4A. The front fairing 200 can include a lower surface 214, and the lower surface 214 can directly contact the roof surface 114. As such, at least portions of the lower surface 214 can be shaped to match the curvature of the roof surface 114. In FIG. 4B, the upper surface 206 of the front fairing 200 is shown as having a similar shape compared to the shape of the roof surface 114, although the upper surface 206 can have a curve that is flatter than the roof surface 114 in the plane shown in FIG. 4B.

Because of the shape of the upper surface 206 of the front fairing 200, the front fairing 200 provides a geometry that is easier to attach features such as solar panels. In particular, the front fairing 200 provides an intermediate structure with an upper surface 206 that has less curvature than the roof surface 114 of the vehicle 100. For example, instead of having compound curvature geometry like the roof surface 114, the upper surface 206 is curved primarily along one plane as opposed to being curved in two perpendicular planes (e.g., a sphere like curvature). As such, features such as solar panels can be attached to the front fairing 200 to extend immediately over and above the forehead region 120. Typical solar panels—even if they are flexible solar panels—cannot be shaped into compound curvatures. With the front fairing 200 design, solar panels can be shaped over a singular curved surface rather than a surface with a compound or sphere-like curvature. This approach not only increases the available area for positioning solar panels but also makes available an area that can be used to generate electricity more efficiently compared to solar panels positioned on the aft region 122 of the roof surface 114.

Further, using the front fairing 200 allows features such as solar panels or other items to be installed on the front fairing 200 before it is attached to the vehicle 100 itself. This can reduce the amount of time an installer needs to be on a scaffolding or some other support structure high above the ground attaching things to the vehicle 100 during assembly.

Figure 5:
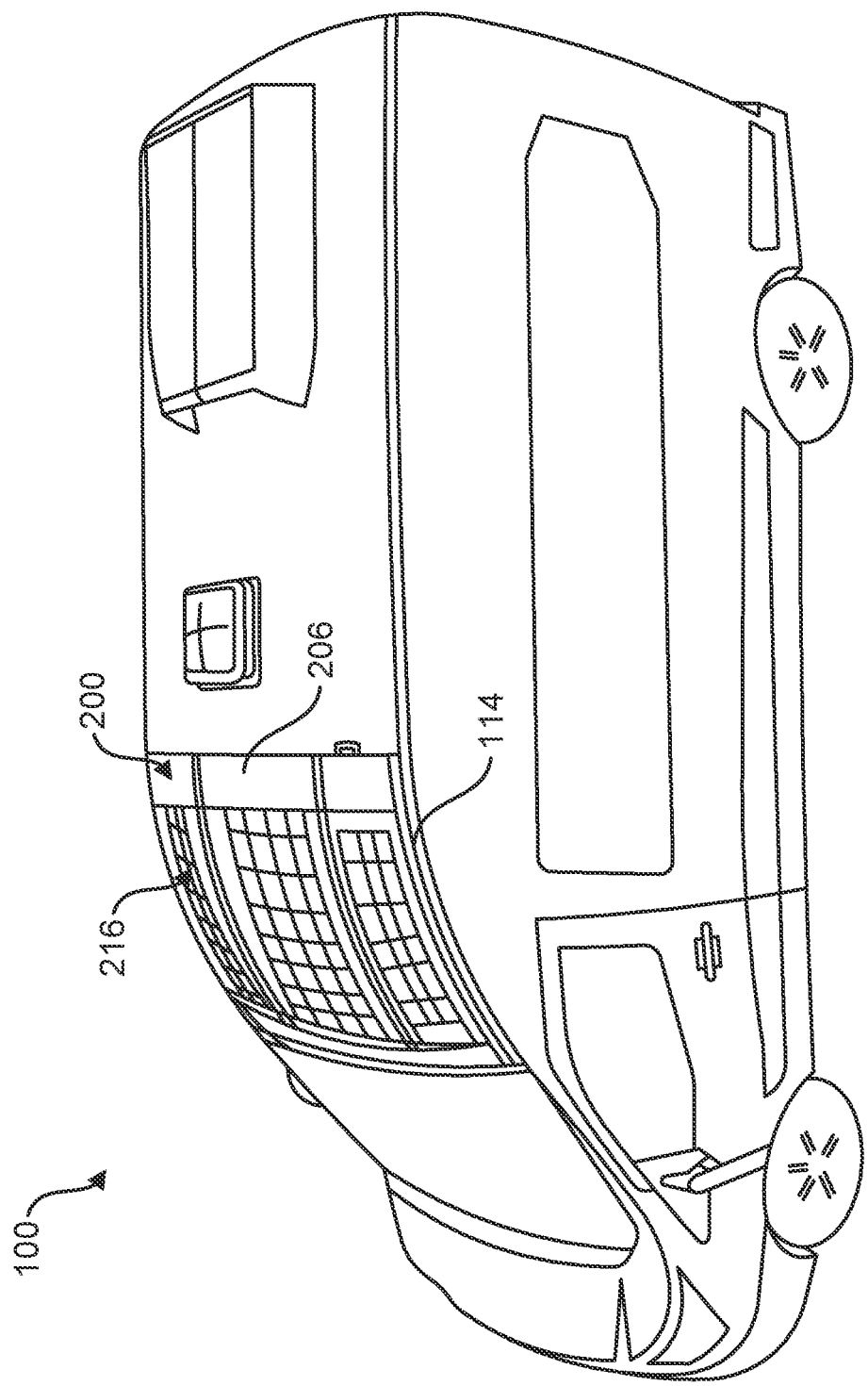
FIG. 5 shows solar panels attached to the front fairing positioned on a recreational vehicle, in accordance with certain embodiments of the present disclosure.

FIG. 5 shows the recreational vehicle 100 with the front fairing 200 attached to the roof surface 114. In this figure, solar panels 216 are attached to the front fairing 200. For example, the solar panels 216 can be directly coupled to the upper surface 206. In some embodiments, the solar panels 216 are adhered (e.g., taped, glued) to the upper surface 206. The solar panels 216 can be flexible solar panels that are able to be shaped or curved to follow the underlying geometry of the upper surface 206 of the front fairing 200. As such, the solar panel 216 can have a curve (within the plane shown in FIG. 4B) with a radius that is substantially the same as the radius of the upper surface 206 and the roof surface 114.

Each solar panel 216 can be positioned in its own recess (e.g., the recesses 208A, 208B, and 208C shown in FIG. 3) in the front fairing 200. Utilizing recesses makes installation of the solar panels 216 easier and more uniform. Although three solar panels 216 are shown in FIG. 5, additional or fewer solar panels can be attached to the front fairing 200.

Figure 6:
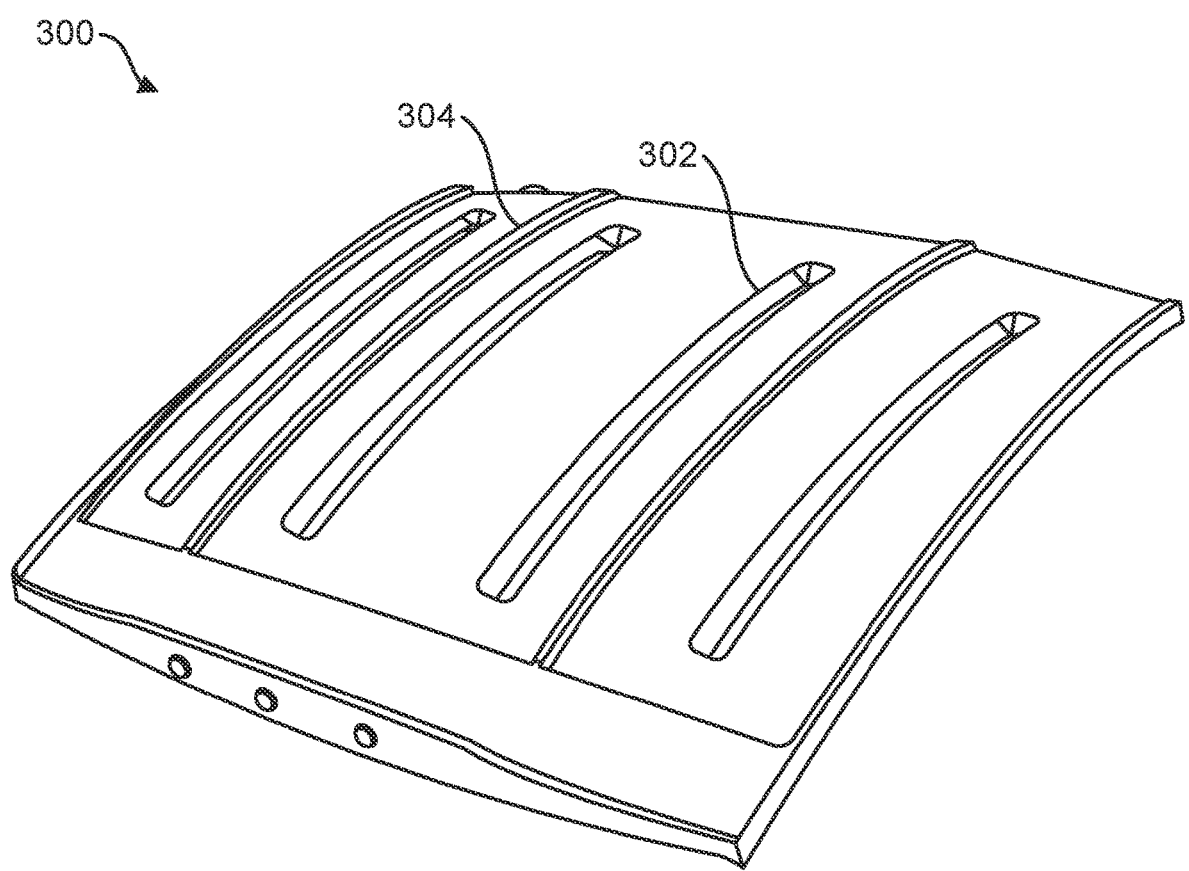
FIG. 6 shows a front fairing with channels, in accordance with certain embodiments of the present disclosure.

FIG. 6 shows another example design of a front fairing 300. In this example, the front fairing 300 includes channels (or pockets) 302 formed in the upper surface of the front fairing 300. The channels 302 can be used for a variety of functions. As one example, the channels 302 can be used such that wires for solar panels can extend through the channels 302 and be hidden from view. As another example, the channels 302 can act as guides for attaching solar panels to the front fairing 300. The front fairing 300 can further include guides 304 that include slots or similar features that help with installing solar panels to the front fairing 300 during installation and that cover edges of solar panels once installed. The guides 304 can also help stiffen the front fairing 300.

Figure 7:
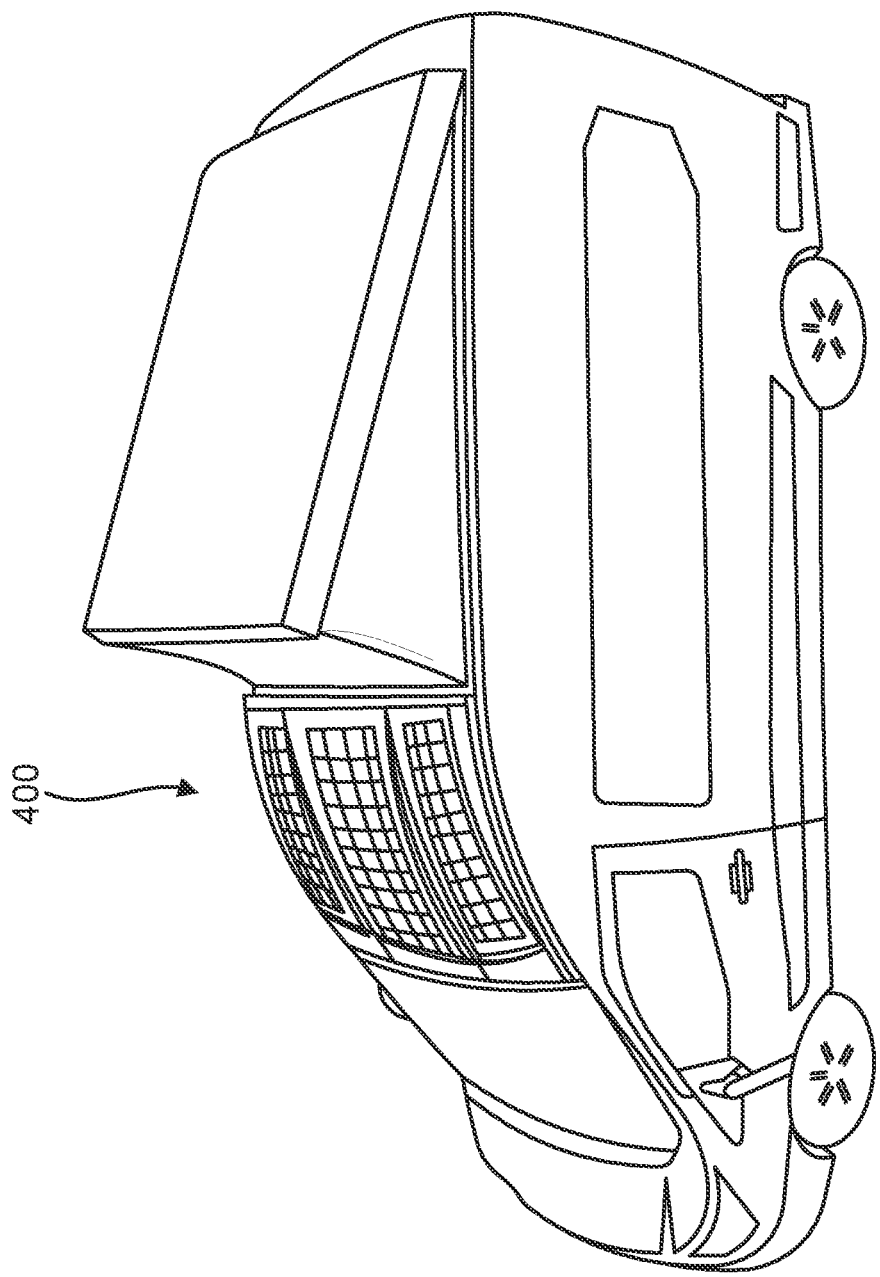
FIG. 7 shows a front fairing positioned on a recreational vehicle with a pop-top, in accordance with certain embodiments of the present disclosure.

FIG. 7 shows a recreational vehicle with a front fairing 400 designed and positioned such that the recreational vehicle can include solar panels and a pop-top.

Figure 8:
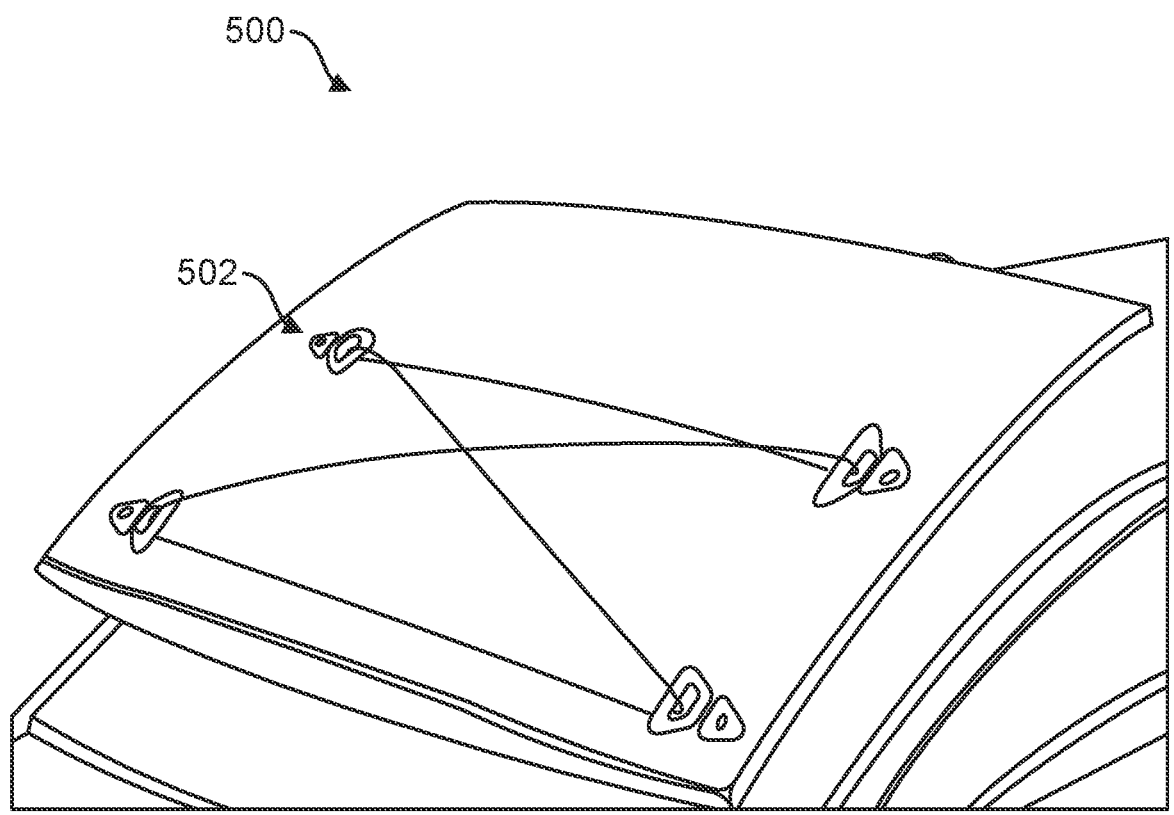
FIG. 8 shows a front fairing with accessory attachments, in accordance with certain embodiments of the present disclosure.

FIG. 8 shows a recreational vehicle with a front fairing 500 with couplers 502 that can be used for tie-downs or similar features for attaching items to the front fairing 500.

Figure 9:
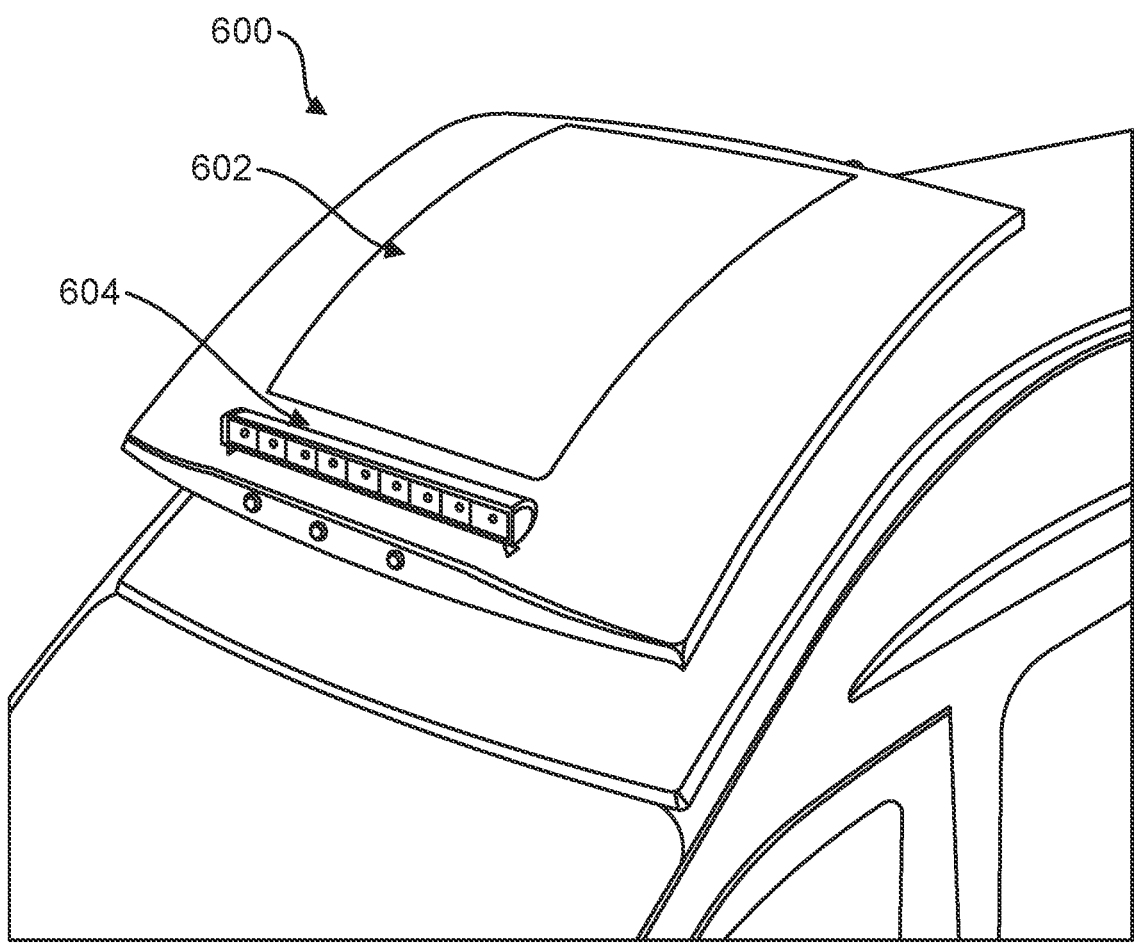
FIG. 9 shows a front fairing with a light bar, in accordance with certain embodiments of the present disclosure.

FIG. 9 shows a recreational vehicle with a front fairing 600 with a solar panel 602 and a light bar 604. The light bar 604 can include an array of lights (e.g., light-emitting diodes, lightbulbs) that can be selectively powered on and off.

Figure 10:
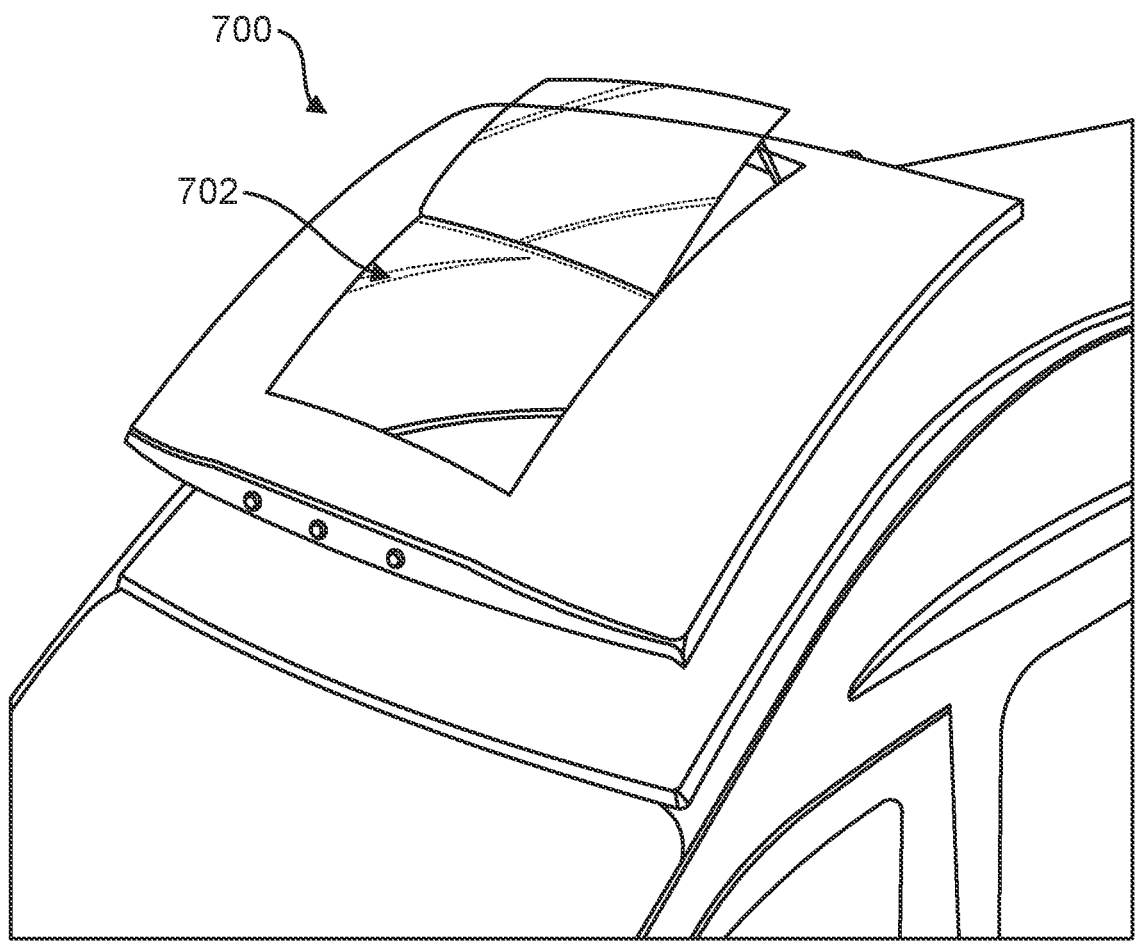
FIG. 10 shows a front fairing with a skylight, in accordance with certain embodiments of the present disclosure.

FIG. 10 shows a recreational vehicle with a front fairing 700 with a skylight 702. The body of the recreational vehicle can be designed such that light passing through the skylight 702 can enter the interior (e.g., the cab area) of the recreational vehicle.

Figure 11:
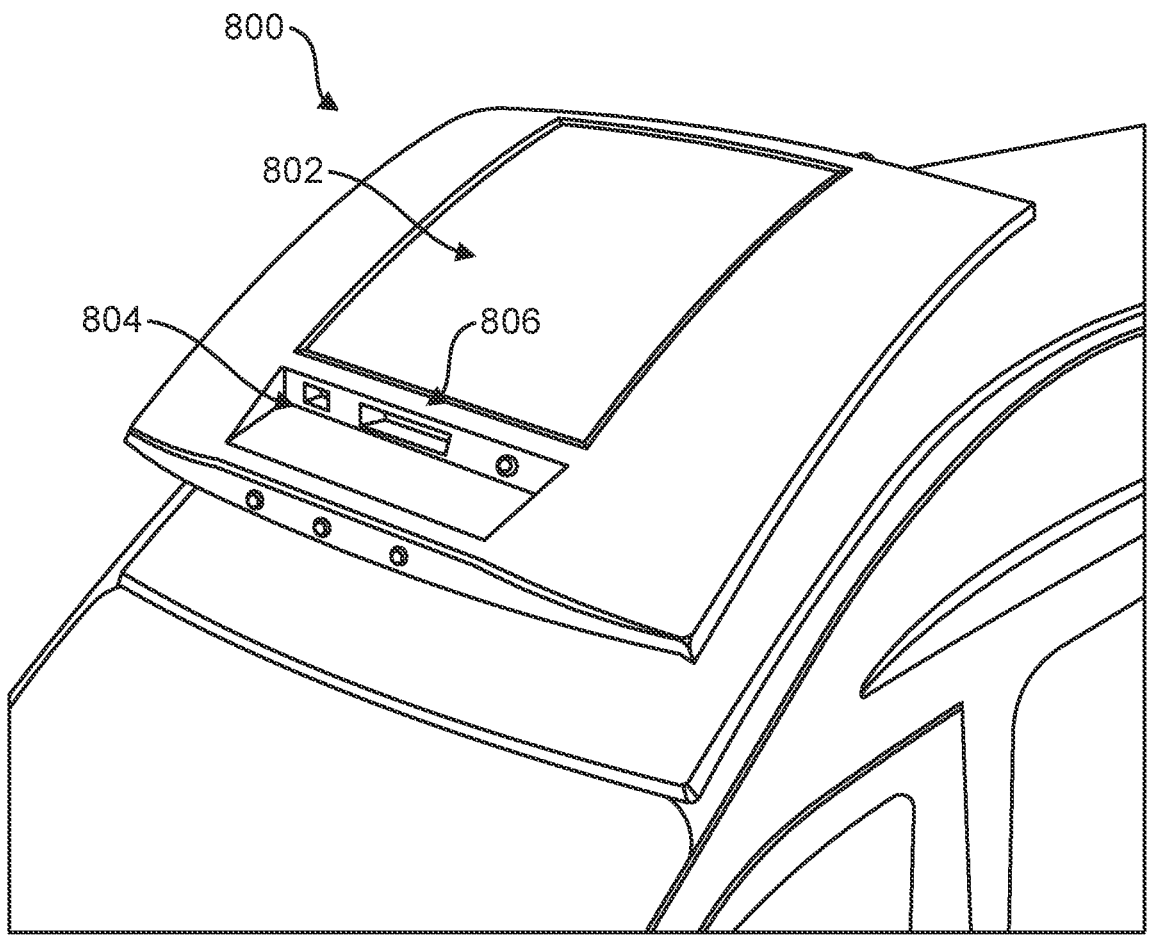
FIG. 11 shows a front fairing with optical sensors, in accordance with certain embodiments of the present disclosure.

FIG. 11 shows a recreational vehicle with a front fairing 800 with a solar panel 802 and one or more sensors 804 positioned in the front fairing 800. The front fairing 800 can also include a light emitter 806 (e.g., a LIDAR device), which emits a pulsed light pattern. The sensors 804 can include optical sensors (e.g., light sensors), proximity sensors, or another type of sensor that can detect reflected light from the pulsed light pattern and/or clearance of the front fairing 800 (e.g., whether the front fairing is clear from trees, bridges, or other items).

Figure 12:
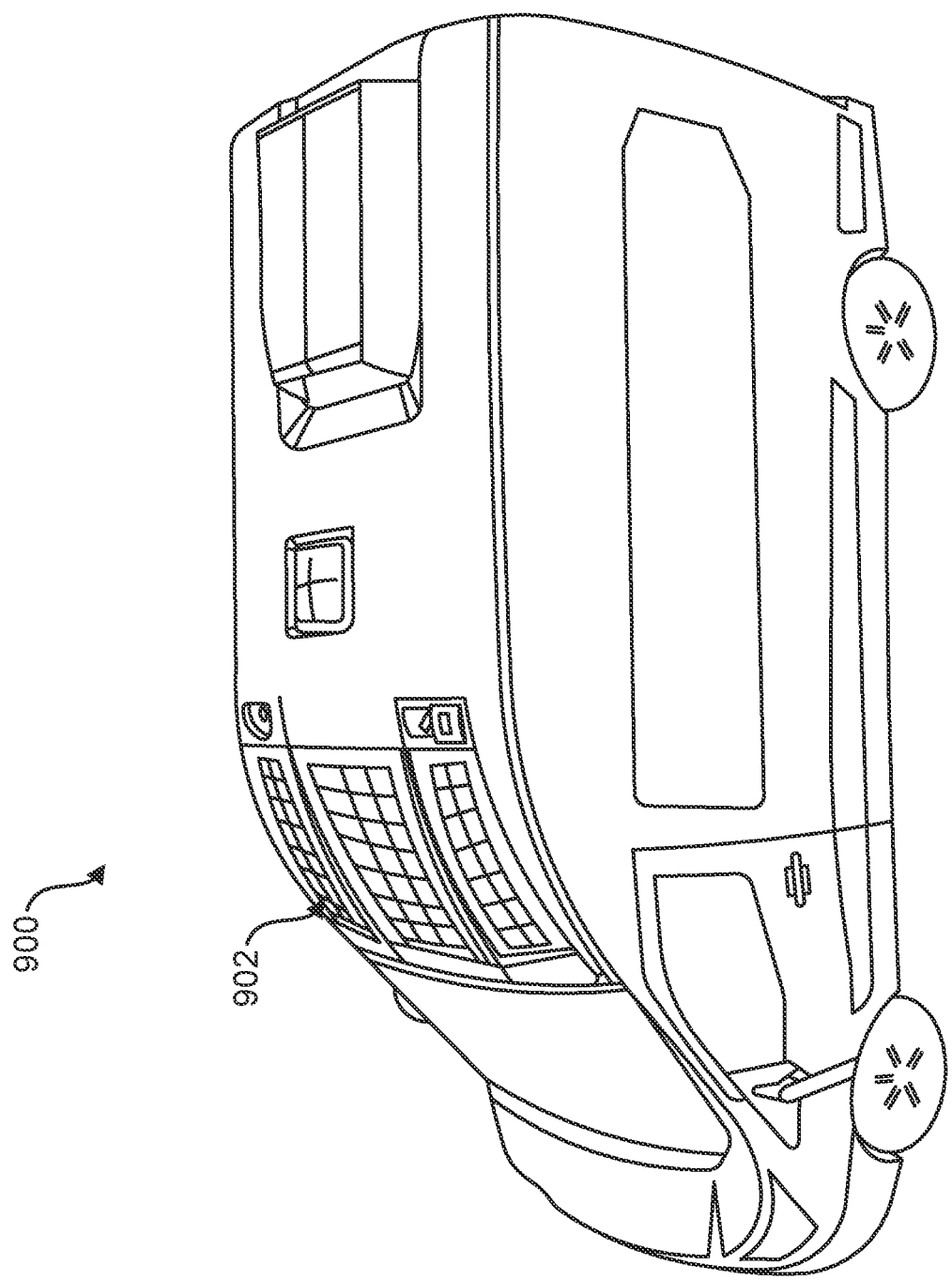
FIG. 12 shows a front fairing extending along an entire length of a roof of a recreational vehicle, in accordance with certain embodiments of the present disclosure.

FIG. 12 shows a recreational vehicle with a fairing 900 that extends along a majority of a roof surface (e.g., an entire length of the roof surface). The fairing 900 can include solar panels 902 as well as openings for roof-mounted items such as an air conditioning unit, roof rack, and/or satellite (or other components).

Figure 13:
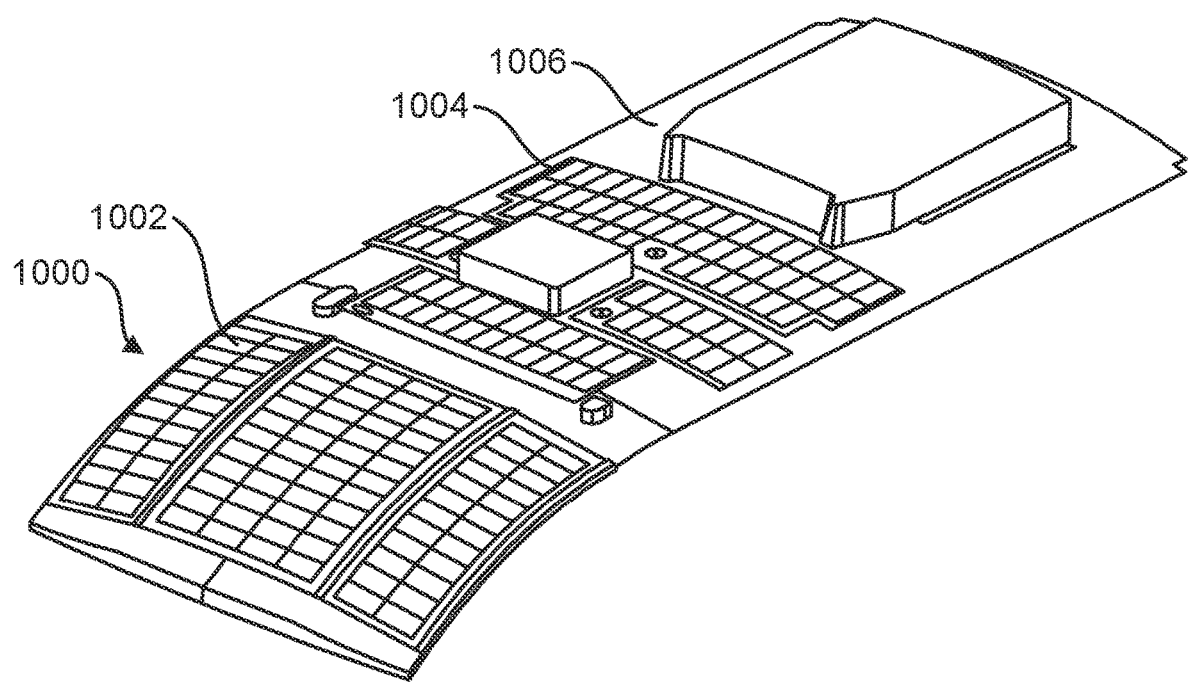
FIG. 13 shows a front fairing that includes solar panels and that is used with roof-mounted solar panels, in accordance with certain embodiments of the present disclosure.

FIG. 13 shows a recreational vehicle with a front fairing 1000 that includes solar panels 1002. The recreational vehicle includes additional solar panels 1004 coupled directly to the roof surface 1006 of the recreational vehicle. With the front fairing 1000, fifty to seventy percent (50-75%) of the available roof surface of the vehicle can be covered by solar panels.

Figure 14:
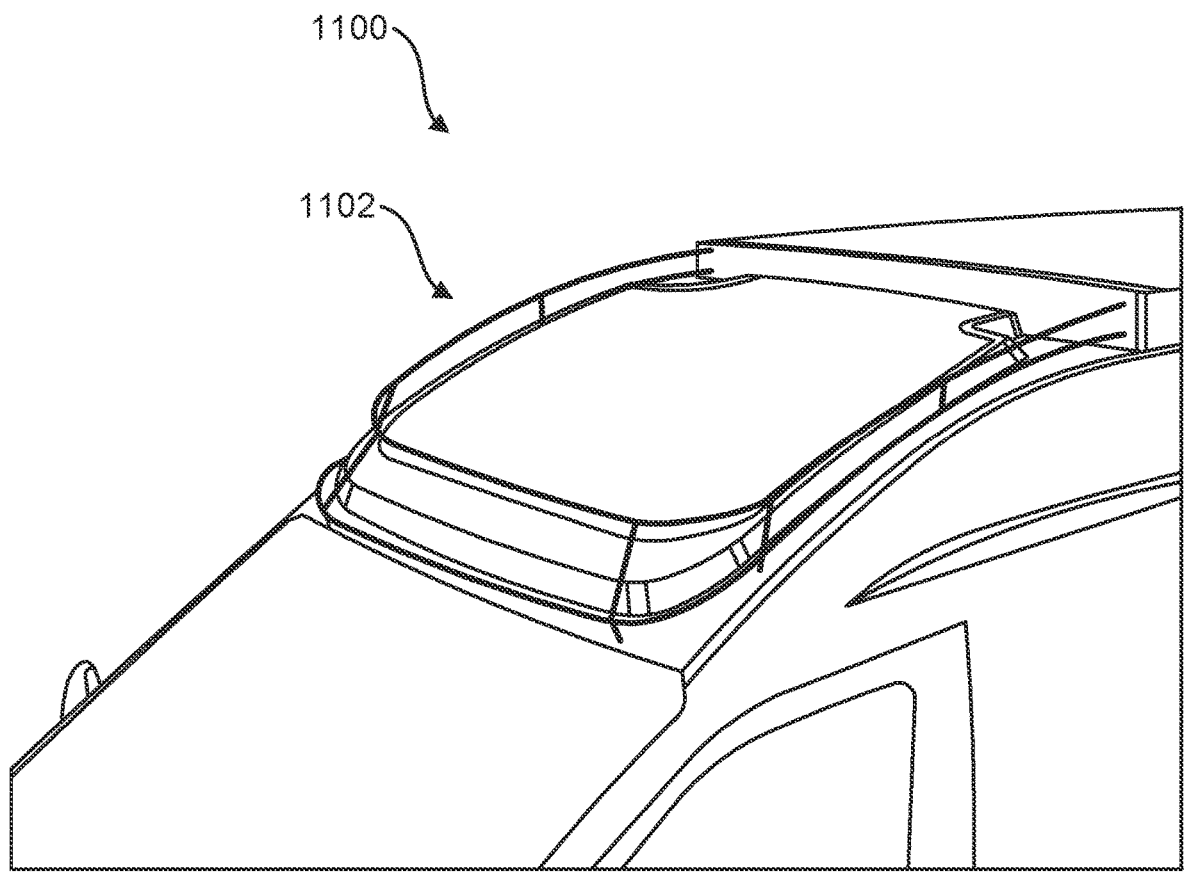
FIG. 14 shows a front fairing used along with a roof rack, in accordance with certain embodiments of the present disclosure.

FIG. 14 shows a recreational vehicle with a front fairing 1100 that includes a roof rack 1102 that at least partially surrounds the front fairing 1100. The roof rack 1102 can provide structure for attaching items to the recreational vehicle and/or to protect solar panels attached to the front fairing. Items attached to the roof rack 1102 can be removed when the recreational vehicle is parked to expose the solar panels to sunlight.

In certain embodiments, the front fairings described above are made from fiberglass. For example, the front fairing can be made via a resin transfer molding process. Other materials could be used, however, for embodiments that utilize solar panels, the selected material should be able to withstand temperatures associated with solar panels to avoid melting/warping issues. For example, materials such as ABS (acrylonitrile butadiene styrene) plastic may not be suitable for use with solar panels because of its tendency to warp at higher temperatures.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A recreational vehicle comprising:
a body having a front end and a back end;
a windshield covering an opening of the body, wherein the body includes a roof surface that begins at a top outer boundary of the windshield and extends towards the back end, wherein the roof surface defines a first curve with a first radius within a first plane and a second curve with a second radius within a second plane that is perpendicular to the first plane; and
a front fairing defining a lower surface and an upper surface, wherein the lower surface contacts the roof surface, wherein the upper surface has a third curve with a third radius in the first plane that is greater than the first curve.

2. The recreational vehicle of claim 1, wherein the lower surface is shaped to match the first curve and the second curve.

3. The recreational vehicle of claim 1, further comprising a first flexible solar panel attached to the upper surface.

4. The recreational vehicle of claim 3, further comprising a second flexible solar panel and a third flexible solar panel attached to the upper surface.

5. The recreational vehicle of claim 4, wherein the front fairing defines a first recess, a second recess, and a third recess, wherein the first flexible solar panel is positioned in the first recess, wherein the second flexible solar panel is positioned in the second recess, wherein the third flexible solar panel is positioned in the third recess.

6. The recreational vehicle of claim 3, wherein the first flexible solar panel has a fourth curve with a fourth radius within the second plane, wherein the fourth radius is equal to the second radius.

7. The recreational vehicle of claim 3, wherein the first flexible solar panel is adhered to the upper surface of the front fairing.

8. The recreational vehicle of claim 3, wherein the front fairing includes a corner tab, wherein a corner of the first flexible solar panel is positioned between the upper surface of the front fairing and the corner tab.

9. The recreational vehicle of claim 3, wherein the front fairing encloses a pocket, wherein wires of the first flexible solar panel extend through the pocket.

10. The recreational vehicle of claim 1, wherein a forwardmost boundary of the front fairing is positioned aft of the top outer boundary of the windshield.

11. The recreational vehicle of claim 1, further comprising lights positioned in a front surface of the front fairing.

12. The recreational vehicle of claim 1, wherein the front fairing includes a skylight.

13. The recreational vehicle of claim 1, wherein the front fairing includes sensors.

14. The recreational vehicle of claim 13, wherein at least one of the sensors is an optical sensor.

15. The recreational vehicle of claim 1, wherein the front fairing extends over an entire length of the roof surface along the first plane.

16. The recreational vehicle of claim 1, further comprising:
a flexible solar panel attached to the upper surface,
wherein the flexible solar panel has a fourth curve with a fourth radius within the second plane, wherein the fourth radius is equal to the second radius,
wherein the flexible solar panel has a fifth surface with a fifth radius that is equal to the third radius.

17. The recreational vehicle of claim 1, further comprising a cab area near the front end and a storage area near the back end.

18. The recreational vehicle of claim 1, wherein the recreational vehicle is a camper van.

19. The recreational vehicle of claim 1, further comprising a pop top, wherein the front fairing is positioned between the top outer boundary and the pop top.

20. The recreational vehicle of claim 1, wherein 50-70% of available area of the roof surface is covered by solar panels and the front fairing.

* * * * *